VARIABLE MAGNETOSTRICTIVE INDUCTANCE DEVICES

Filed April 15, 1964

INVENTORS
Takashi Tanaka
Minoru Sakata
Hozumi Hirota
Yukihiro Yanagiuti
By Stevens, Davis, Miller & Mosher
ATTORNEYS United States Patent Office 3,299,382
Patented Jan. 17, 1967

3,299,382

VARIABLE MAGNETOSTRICTIVE INDUCTANCE DEVICES

Takashi Tanaka, Yao-shi, Minoru Sakata, Osaka, Hozumi Hirota, Neyagawa-shi, and Yukihiro Yanagiuti, Moriguchi-shi, Japan, assignors to Matsushita Electric Industrial Co., Ltd., Osaka, Japan, a corporation of Japan Filed Apr. 15, 1964, Ser. No. 359,943
Claims priority, application Japan, Apr. 17, 1963, 38/28,930; Apr. 19, 1963, 38/174, 38/20,603; Apr. 20, 1963, 38/29,850, 38/29,851
2 Claims. (Cl. 336—20)

This invention relates to a variable magnetostrictive inductance device, and more particularly to that having a magnetic core of so-called closed-magnetic-circuit type.

Most of the variable inductance devices having magnetic cores and being of the so-called open-magnetic-circuit types necessarily have air gaps in the magnetic circuits and have effectively low over-all permeabilities, even though the materials themselves of the cores are of high permeabilities.

As a result, said variable inductance device of an open-magnetic-circuit type results in a lower value of the maximum inductance than the variable inductance device of a closed-magnetic-circuit type. Accordingly, it is necessary for achieving a given maximum inductance that the former device be of a larger size than the latter device.

A conventional variable inductance device of a closed-magnetic-circuit type is of a relatively complex construction and consequently of a large size.

An object of the present invention is to provide a variable inductance device of a closed-magnetic-circuit type having a simple construction and a small size.

Another object of the present invention is to provide a variable inductance device characterized by a superior performance.

A further object of the present invention is to provide a variable inductance device having movable member which can be prepared simply by a conventional mechanical technique.

A still further object of the present invention is to provide a variable inductance device having an extremely small size and relatively high value of the maximum inductance.

Other objects and particularities of the present invention will be obvious from the following descriptions with reference to the accompanying drawings, in which:

FIG. 1 is a graph illustrating a relation between magnetic permeability and mechanical pressure which is applied to a magnetic core in a way as shown in FIG. 2.

FIGS. 3 through 7 show several embodiments of the present invention, illustrated somewhat schematically.

Figures 1, 2, 3, 4, 5, 6, 7A, 7B:
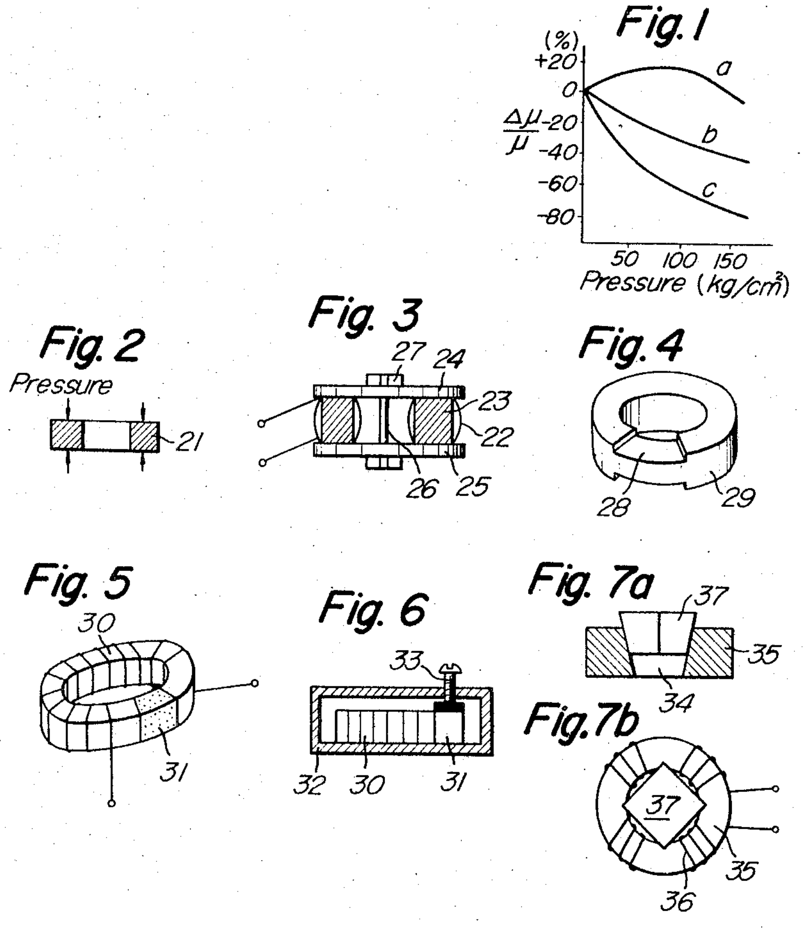

Various types of variable inductance devices have been used practically. One type includes a bobbin which carries a winding and a magnetic core which is longitudinally movable within the bobbin. For effecting the longitudinal movement, the screw core may be engaged with the threaded bobbin. The magnetic core may be connected to a screw rod which is engaged to a threaded part of an environment case.

Another type of known variable inductance device comprises a drum core provided with a winding and a cup core movable with respect to a support for the drum core and the winding.

Another type of known variable inductance device comprises an annular magnetic core having an air gap into which a movable magnetic element is inserted for controlling the effective magnetic resistance of the air gap.

It is difficult to make the above devices small. In addition, since they are of a so-called open-magnetic-circuit type, the effective over-all permeability of the core is remarkably low even though the core material is of high permeability. Consequently, the device is necessarily of a larger size than that of the device of a closed-magnetic-circuit for achieving an equal value of the maximum inductance.

One type of a known variable inductance device of a closed-magnetic-circuit comprises an annular magnetic core provided with a winding and a movable electrical contact against the winding. By rotating the contact inductance value is changed. It is necessary that the winding in this construction be formed of a single layer of bare conductor, and each turn of the winding be insulated from each other. Therefore, this construction is apt to result in a relatively large size. In addition, inductance value varies not continuously but stepwise. In the case of a small inductance device, it is difficult to obtain a good contact. The winding is apt to break easily. It is not easy to prepare the movable parts by a per se well-known art.

Another type of known variable inductance device of the closed-type-magnetic-circuit comprises an annular magnetic core provided with an inductance winding and a direct current winding which is energized from a variable direct current source. The D.C. source may be of a constant voltage and a variable resistance may be connected in series to said source. This type of device necessitates the use of an additional direct current source and a resistance which result in an undesirable increase in the overall size of the device. In addition, there frequently appears hysteresis phenomenon in the relation between current values and inductance values, which is undesirable for practical use.

According to the present invention, variable inductance devices are provided having substantially no such faults or disadvantages as above-mentioned, and may be of extremely small size and desirable performance.

In general, magnetic materials have a magnetostrictive property such that their magnetic permeabilities vary with a mechanical pressure or tension externally applied thereto. The magnetostrictive phenomenon is important for realizing magnetic transducers and so on, but, in general, has been considered undesirable, in view of the fact that, it impairs performance and stability of magnetic materials. According to the present invention it has been discovered that the magnetostrictive phenomenon is very useful for providing a variable inductance device of a closed-magnetic-circuit type.

FIG. 1 shows relations between permeabilities of magnetic cores and mechanical pressures externally applied thereto. Referring to FIG. 2, the external pressure P was applied to an annular magnetic core 21 uniformly in the axial direction. Permeabilities were determined with varying pressure P. In FIG. 1, a curve *a* is for a ferrite core consisting of 56 mol percent of $Fe_2O_3$, 44 mol percent of NiO, and 0.8 mol percent of CoO. The curve *a* shows that, with an increase in the external pressure, the permeability increases first and then decreases. However, curves *b* and *c* in FIG. 1 show that the permeabilities monotonously decrease with an increase in the external pressure. Said curve *b* is for a ferrite consisting of 58 mol percent of $Fe_2O_3$, 16 mol percent of NiO, 25 mol percent of ZnO, and 1 mol percent of CoO, and said curve *c* is for a ferrite consisting of 49 mol percent of $Fe_2O_3$, 31 mol percent of NiO, and 20 mol percent of ZnO.

Referring now to the embodiment of the present invention shown in FIG. 3, a variable inductance device according to this invention comprises a magnetic core 23 provided with a winding 22, a pair of end plates 24 and 25 sandwiching said core and winding and a bolt 26 with a nut 27 for assembling the above parts into one body. The rotation of said nut 27 with respect to said bolt 26 changes the external pressure applied to the magnetic core 23, and consequently changes the permeability of the core so as to change the inductance value of said device.

The present invention enables the provision of a miniature variable inductance device with a high value of the maximum inductance. In addition, the movable parts required are only a bolt and a nut of suitable metal, so that the device can be manufactured by a simple conventional technique.

In the embodiment shown in FIG. 3, the external pressure will be also applied to the winding 22, so as to cause creeping of the copper of the winding. The creeping will decrease the pressure applied to the magnetic core 23 with a passage of time.

In order to eliminate the above-mentioned fault, an annular magnetic core 29 may be provided, as shown in FIG. 4, with one or more recesses 28 formed therein. The winding is to be disposed in said recess although FIG. 4 does not show the winding. With such a construction, the external pressure is applied to the magnetic core only, but not to the winding, and a change in the inductance value with time is substantially prevented.

In FIG. 5, another embodiment of the invention is shown. An annular magnetic core 30 is cut out at a portion, and this portion is filled with a magnetic material 31 particularly sensitive to the external pressure applied thereto.

In the case of the ferrite core, two kinds of ferrite materials can be pressed and fired together, as shown in FIG. 5. The external pressure is applied to the core portion 31 only as shown in FIG. 6. The external pressure can be applied to the core portion 31, for example, by means of a screw rod 33. The magnetic core portion 30 having the winding may be formed of a material of high permeability and/or of high Q, while the core portion 31 may be of such a material of which permeability varies remarkably with a change in the external pressure applied thereto. Alternately, the magnetic core may wholly be formed of a material highly sensitive to pressure, a portion thereof being exposed to the external pressure applied thereto.

In the embodiment shown in FIGS. 7*a* and 7*b*, an annular magnetic core 35 having a winding 36 is provided with a tapered bore 34, into which a wedge 37 is inserted. The external tensional force applied to the magnetic core is changed by driving the wedge into the bore, thus varying the inductance value.

We claim as our invention:

1. A variable inductance device comprising an annular magnetic core having a pair of axial ends and at least a recess formed therein, a winding disposed in said recess in said magnetic core, a pair of end plates sandwiching said magnetic core with said winding and engaging the axial ends of said core, and means for changing the sandwiching pressure of said end plates, whereby the pressure is applied to said core in the regions where said end plates engage said axial ends.

2. A variable inductance device comprising an annular magnetic core having an axial tapered bore, a winding disposed on said magnetic core, a wedge member axially movable with respect to said tapered bore and having its sides engaging the sides of said bore to apply tensional forces to said magnetic core, and means for axially driving said wedge member.

References Cited by the Examiner

UNITED STATES PATENTS

| | | | |
|---|---|---|---|
| 381,815 | 4/1888 | Ries | 336—136 X |
| 1,420,989 | 6/1922 | Fondiller | 336—178 X |
| 3,068,381 | 12/1962 | Vazquez | 336—229 X |
| 3,239,783 | 3/1966 | Yetter | 336—179 |

FOREIGN PATENTS

| | | |
|---|---|---|
| 268,040 | 3/1927 | Great Britain. |

LEWIS H. MYERS, *Primary Examiner.*

T. J. KOZMA, C. TORRES, *Assistant Examiners.*